United States Patent [19]

Rodriguez

[11] 4,196,570
[45] Apr. 8, 1980

[54] MECHANIZED HARVESTING MACHINE

[75] Inventor: Henry Rodriguez, Rte. #1, Box 73K, McNeal, Ariz. 85617

[73] Assignee: Henry Rodriquez, McNeal, Ariz.

[21] Appl. No.: 963,687

[22] Filed: Nov. 27, 1978

[51] Int. Cl.$^2$ .................... A01D 45/22; A01D 45/24; A01D 45/30

[52] U.S. Cl. ......................................... 56/126; 56/330

[58] Field of Search ................................. 56/126–130, 56/327 R, 330, 331, 110

[56] References Cited

U.S. PATENT DOCUMENTS

| | | | |
|---|---|---|---|
| 1,303,120 | 5/1919 | Scott et al. | 56/130 |
| 2,374,162 | 4/1945 | Bell | 56/128 |
| 2,495,417 | 1/1950 | McConnel et al. | 56/129 |
| 2,874,528 | 2/1959 | Esch | 56/126 |
| 3,473,304 | 10/1969 | Morgan | 56/126 |
| 3,830,048 | 8/1974 | Ervin | 56/331 |

*Primary Examiner*—Russell R. Kinsey

*Attorney, Agent, or Firm*—LaValle D. Ptak

[57] ABSTRACT

A mechanized harvesting machine particularly suitable for picking or harvesting vegetables such as peppers and tomatoes uses a single rotating helical guide member carried on a shaft aligned longitudinally above the row of plants to thread its way through the plants with minimal disturbance. Arcuate picking elements are attached between the helical guide and the shaft for pushing and pulling the vegetables or other crops to be harvested from the plant, as the helical guide member is rotated through the row of plants. The guide member is operated parallel to the ground and turns in a single direction, leaving the plants in a relatively undisturbed condition after they have been picked so that the plants may be used to grow a subsequent crop. The harvesting machine includes conveyor belts located on opposite sides of the helical guide member for catching the vegetables after they have been picked to convey them to a convenient storage bin on the machine.

16 Claims, 5 Drawing Figures

MECHANIZED HARVESTING MACHINE

BACKGROUND OF THE INVENTION

For many years grain crops, such as wheat, oats, corn and the like, have been harvested by automatic harvesting or picking machines. Such machines have resulted in a substantial reduction of the man hours required to harvest a crop. As a result, a single farmer now is capable of farming large acreages which were unheard of in the labor intensive farming industry at the turn of the century.

While large-scale mechanized farming operations are commonplace in the grain farming regions of the world, particularly in the United States and Canada, vegetable farming generally is a labor intensive business. Most vegetables are harvested by hand, which requires a large number of workers per acre of crop to accomplish the harvesting since the crop generally has only a very short time (a matter of a very few days) in most cases when it is at its peak for harvesting. As labor costs continuously increase, the costs of vegetables produced on such farms continues to rise accordingly.

Efforts to alleviate the high cost of labor in harvesting vegetable crops have resulted in some mechanical harvesting machines. Mechanical harvesting of beans and peas has been accomplished relatively efficiently by the use of machines which take the bean or pea plant and run it through counter-rotating beaters or a single rotating beater formed by a number of extending beater fingers rotated at relatively high speed about a central shaft in the machine. The beater fingers knock the beans or peas from the remainder of the plant. In the case of a pea picking machine, the beaters also burst open the pea pods; so that the peas fall out of the pods. In a pea picking machine, the peas are permitted to fall through appropriately sized meshes from which the peas are conveyed to a storage bin. The remainder of the plant is blown away by a blower or other suitable apparatus and discarded.

Bean picking machines operate in a similar manner, and separation of the leaves and stem portions of the bean plants from the beans themselves is accomplished in various ways in such machines. These machines, however, in most cases effectively destroy the plant; so that if a second crop is desired, it is necessary to replant the field for the purpose of producing such a second crop.

Some bean picking and pea picking machines are operated with an intent to preserve the plant. The use of brushes and beater fingers in such machines, however, results in the stripping of a large number of leaves from the plant. In addition, branches and stems of the plant are frequently broken. As a result, the condition of the plant after the harvesting machine has passed over it is substantially weakened. In many cases, the plant is damaged to such an extent that it is incapable of producing a second crop.

Even though mechanized harvesting machines have been used with some degree of success for picking beans and peas, mechanized picking machines for peppers (such as green and red chiles, bell peppers and the like) and tomatoes capable of harvesting the crop, without damaging it or destroying the plant or both, have not been developed. Several attempts have been made to utilize some of the principles employed in bean picking and pea picking machines to adapt such machines for the picking of peppers and tomatoes, but these attempts have met with failure. As a consequence, it has been the practice in the raising of peppers and tomatoes to harvest the crop by hand. The cost per acre of harvesting these crops is a significant factor in the ultimate market price.

Accordingly, it is desirable to harvest the crops from pepper plants and tomato plants with a mechanized harvesting machine. Such a machine ideally should harvest the crop without damage to the crop itself (since if the peppers or tomatoes are broken or bruised they are practically unmarketable). In addition the machine, to the extent possible, should leave the plant in a strong and healthy condition after the harvesting operation; so that the plant can be used to produce subsequent crops. This is particularly desirable in the case of plants growing chile peppers and the like, where a plant may be used to produce as many as three or four different crops in a growing season before it is necessary to replant the field with new plants. If a mechanized harvesting machine is not capable of leaving the plants in a healthy condition for the production of subsequent crops, its value is substantially reduced since it then would be necessary to replant the entire crop after each harvesting operation.

SUMMARY OF THE INVENTION

Accordingly, a preferred embodiment of this invention comprises a mechanized harvesting machine in which the harvesting element is mounted on a rotatable shaft oriented parallel to the ground and moved longitudinally over the row of plants to be harvested. A helical guide member is attached to and centered on this shaft, and the guide member has a number of arcuate picking elements connected between it and the shaft. Each of the picking elements extend into the space between adjacent turns of the helical guide member. As the picking elements brush against the plant through the action of the rotation of the guide member, the peppers, tomatoes or other vegetables are pushed or pulled from the plant and dropped onto a conveniently located collecting member. The plant leaves merely are pushed out of the way and remain undamaged.

DETAILED DESCRIPTION OF THE PREFERRED EMBODIMENT

Figure 1:
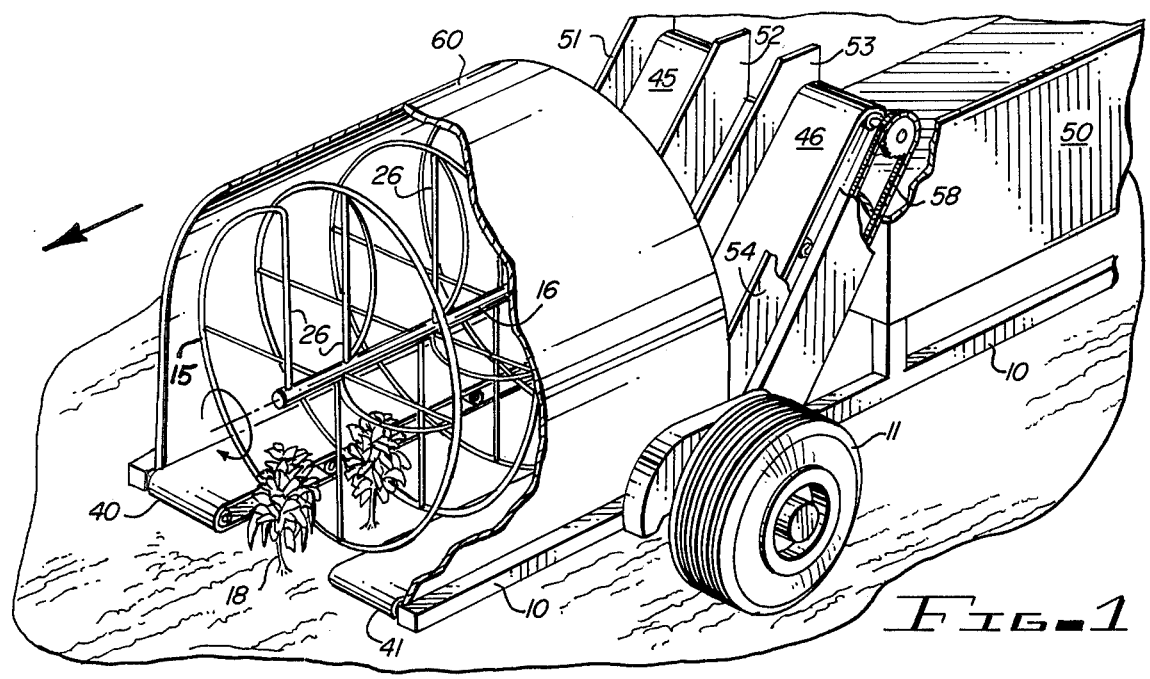
FIG. 1 is a partially cut-away, diagramatic, perspective view of a preferred embodiment of the invention.

Reference now should be made to the drawing in which the same reference numbers are used in the several figures to designate the same components.

FIG. 1 is a partially cut-away, diagramatic representation of a mechanized harvesting machine constructed in accordance with the preferred embodiment of the invention. This harvesting machine is particularly suitable for automatic mechanical harvesting of crops such as peppers and the like. The machine of FIG. 1 may be pulled by a tractor or it may be incorporated into a self-propelled machine, if desired. The portions of the harvesting machine shown in FIG. 1 which comprise the hitch and front frame for attachment to the tractor have not been shown since these can be in the form of a number of conventional configurations, and to show them would obscure some of the details of the harvesting machine apparatus itself.

Figure 3:
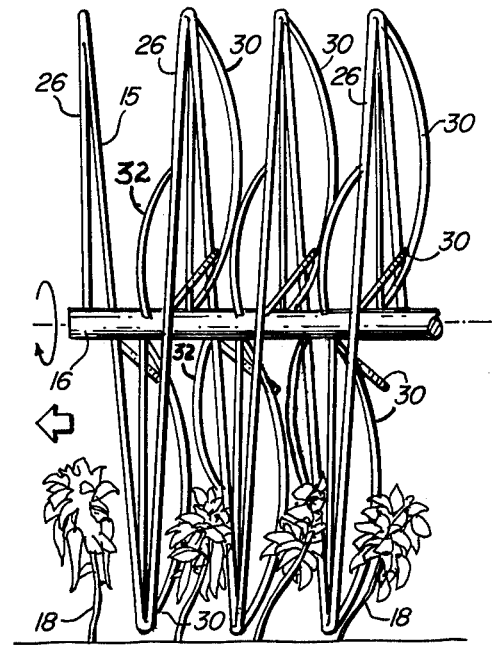
FIG. 3 is a side view of a portion of the apparatus shown in FIG. 1.
Figure 4:
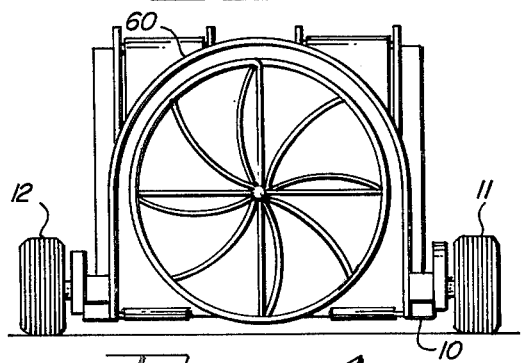
FIG. 4 is an end view of the apparatus shown in FIG. 1.
Figure 5:
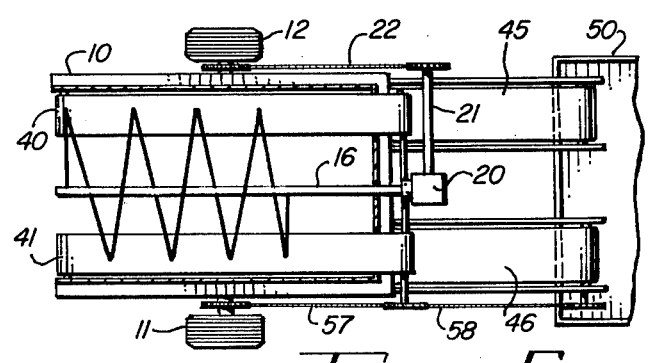
FIG. 5 is a diagramatic representation of a portion of the apparatus shown in FIG. 1 but on a reduced scale.

The machine, which is depicted most clearly in FIGS. 1, 4 and 5, is mounted on a main frame 10 supported by a pair of wheels 11 and 12 located on opposite sides of the machine. The machine is constructed to cause the frame 10 to ride very close to the ground; so that a helical guide member 15, horizontally supported on rotatable shaft 16, approaches very close to the ground as the machine is moved directly over a row of plants 18 (typically pepper plants) to be harvested. The shaft 16 is rotated in the direction of the arrows shown in FIGS. 1, 2, and 3 and is mounted at each end in conventional bearings (not shown) to facilitate its rotation. Support for the ends of the shaft 16 on the frame of the machine may be effected in any suitable manner not interfering with the plants 18 to be picked. For example, such support may be provided by cross frame members extending across the open ends of the shroud 60 and attached to the shroud 60. Other structural arrangements of conventional types also may be employed. The drive linkage for the shaft 16 is indicated in FIG. 5 as being supplied through a gear box 20 having an input drive shaft 21 rotated by means of a chain 22 driven by the rotation of the wheel 12. By selecting appropriate gear ratios in the gear box 20, the speed of rotation of the shaft 16, and therefore the helical guide member 15, is coordinated with the forward speed of movement of the picking machine in the direction of the arrow shown in FIGS. 1 and 3.

The speed of rotation of the helical guide member 15 is selected relative to the foward speed of the machine to cause the member 15 to thread its way through the successive plants 18 in the row in such a manner that, in an ideal situation, the continuously rotating helical guide member 15 maintains a fixed longitudinal position relative to the two plants between which it rotates. Thus, the stems of the plants 18 are undisturbed by the helical guide member 15. To accomplish this, it is necessary for the helix 15 to appear to advance toward the rear of the machine as it is rotated clockwise (as viewed in FIGS. 1 and 2) as the machine is moved forward over the row of plants. The gear ratios of gears in the gear box 20 may be made adjustable to accommodate for slight variations in manufacturing tolerances from one machine to another. The gear box 20 also may be supported on a suitable conventional cross frame member attached to the shroud 60 or the lower frame members 10. Typically the support used for the right hand end of the shaft 16 also may be used to support the gear box 20. The details of such support are not necessary to an understanding of the invention and for that reason have not been shown. In addition, if helical guide members 15 having a different pitch (that is different turn-to-turn spacing) are used, it may be necessary to vary the speed of rotation of the shaft 16 relative to the forward speed of movement of the machine in order to cause the helix 15 to thread its way through the row of plants without disturbing them.

By using the helix member 15 in the manner described above, it is possible to move the machine directly over a row of plants and cause the helical guide member 15 to be very near the ground (on the order of one or two inches from the ground); so that a complete picking operation of the plant is accomplished, while leaving the plant relatively undisturbed, permitting it to produce subsequent crops for later harvesting.

To support the helical guide member 15 on the shaft 16, straight support rods 26 are attached between the shaft 16 and the member 15 at 90 degree intervals throughout the length of the member 15. These rods 26 are uniformly spaced along the shaft 16, as shown most clearly in FIGS. 1 and 2. The first of the rods connects the open end of the helical guide member 15 to the shaft 16, and the last of the rods 26 completes the connection with the open rearmost end of the guide member 15, as shown in FIG. 1.

To accomplish the harvesting of peppers tomatoes or other vegetables or fruits from the plants 18, arcuate picking elements are attached between the helical guide member 15 and the shaft 16 and extend at an angle of approximately 45 degrees from a plane passing through the longitudinal axis of the shaft 16 (as shown most clearly in FIG. 3). These picking elements are formed into two groups of elements. The elements 30 of the first group are spaced at 90 degree intervals from one another and, for purposes of illustration, are shown as connected to opposite ends of each of the support rods 26. The elements 30 each comprise rods having an overall length greater than the length of the support rods 26 (typically an overall length of 27 inches compared with a length of 20 inches for the support rod 26), and thus, are formed as arcuate sections or arcs of a circle. As shown most clearly in FIG. 3, the planes of the picking elements 30 extend toward the rear of the machine at approximately a 45 degree angle with respect to planes passing through the rods 26 and the axis of the shaft 16. The area toward the center of the circles from which the arcuate picking elements 30 are formed constitutes the picking area or the area into which the picked peppers or other vegetables or fruits fall during operation of the machine.

The second group of picking elements comprises picking elements 32 in the form of arcuate rods of the same length and radius of curvature as the rods 30. The elements 32, however, extend toward the front of the machine at approximately a 45 degree angle with respect to planes passing through the rods 26 and the axis of the shaft 16. The picking elements 32 also are located uniformly about the shaft 16 and the guide member 15 at 90 degree intervals. As shown most clearly in FIGS. 2 and 4, the picking elements 32 are offset angularly from the picking elements 30 by 45 degrees; so that as the shaft 16 is rotated, the plants 18 which are passed over by the picking machine are alternately contacted first by a picking element 30 from the first group, then by a picking element 32 from the second group and so on alternately until the guide member 15 has passed completely over the plant 18. The manner in which this is accomplished is shown most clearly in FIG. 3, which illustrates the plants 18 underneath the shaft 16 and within the turn-to-turn spacings of the helical guide member 15. The row of plants 18 also is offset a few inches to the left of the shaft 16 (as viewed in FIG. 1), as the machine is driven over the row to be harvested.

When the member 15 is rotated to the position shown in FIG. 3, the plants 18 are pushed toward the right (as viewed in FIG. 3) by the lowermost, vertically aligned picking elements 30. As the machine continues to move forward and to rotate the shaft 16 in the direction of the arrows of FIG. 3, the picking elements 30 move upwardly and toward the left (as viewed in FIG. 2) to brush the front side of the plant as the elements 30 move upwardly. When this occurs, peppers, tomatoes or other vegetables hanging on the plant slide along the picking elements 30 away from the helical guide member 15 to some point where they snap off and drop past the picking elements 30 on their concave sides to fall to one side of the helical guide member 15. As this occurs, the next successive picking element 32 of the foward-bent second group of picking elements contacts the opposite or rear side of the plant 18 to begin another upward stripping motion away from the guide member 15 of the peppers on that side of the plant. As the peppers break off under the upward urging of the picking element 32, they fall off to the side of the helical guide member 15 (as shown in FIG. 1 and 4). As the picking element 32 continues to pass by the plant and moves upwardly, it continues to brush the back side of the plant to pull off any peppers which may still remain on the plant on that side as the element 32 continues its upward direction of movement under the clockwise rotation of the helical guide member 15. While this is happening, the next rearward oriented picking element 30 from the first group of picking elements commences pushing up on the front side of the plant 18 to engage any peppers which may have been missed by the passage of the previous picking element 30 in the first group of elements. This operation continues as the helical guide member 15 continues to pass over the plant, subjecting the plant to a serpentine pushing and pulling back-and-forth movement as it is alternately engaged by the rearward facing and forward facing picking elements 30 and 32 rotating into it. Both groups of elements always pick with an upward motion as the picking operation continues.

The leaves of the plants 18 are flexible enough that they simply pass over the picking elements 30 and 32 without any ill effects. Since the main helical guide member 15 is rotated at a speed relative to the forward speed of movement of the machine such that it appears to remain stationary with respect to the plant being picked, the main stem of the plant 18 is not subjected to any substantial pressures, so that it is not broken. After the machine has passed over the plants 18, providing a number of opportunities for the picking elements 30 and 32 of both groups to engage opposite sides of each plant, substantially all of the peppers, tomatoes, or similar crops have been stripped from the plants. In a machine which has been operated for picking green chile peppers, the harvesting resulted in better than 95 percent picking of the crop, including effective and efficient picking of peppers located very near the base of the plant.

Once the peppers, tomatoes, or other crops have been broken loose from the plants 18 by the picking elements 30 and 32, they drop on one or the other of the sides of the helical guide member 15 onto one of a pair of rearward moving conveyor belts 40 and 41 (shown most clearly in FIGS. 1 and 5). These belts 40 and 41 discharge onto a pair of upwardly inclined conveyor belts 45 and 46, which convey the picked crop into a storage bin 50 located at the rear of the harvesting machine, as shown in FIG. 1. The bin 50 is supported above the frame 10 to provide clearance for the plants 18 to pass under it as the machine is moved forward over the row of plants. To prevent the peppers or other harvested crops from falling out of the machine, the conveyor belts 45 and 46 are each carried between a pair of side guide rails 51, 52 and 53, 54, respectively. The speed of operation of all of the conveyors 40, 41, 45 and 46 also may be controlled in accordance with the forward speed of the machine, if desired, by a suitable chain drive 57, 58 or other conventional drive mechanism controlled by the rotation of the wheel 11. The picking elements 30 and 32 have not been shown in FIG. 5 in order to avoid unnecessary cluttering of the drawing, particularly since these elements are shown in the other figures. FIG. 5 is included to show the location of the conveyor belts 40 and 41 of the machine with respect to the helical guide member 15.

In FIG. 1, the angle of pitch of the conveyors 45 and 46 is exaggerated to a rather steep angle. If the conveyor belts 45 and 46 are located at a sharp or steep angle, these belts preferably would include buckets or partitions moving with the belts 45 and 46 to carry the peppers or other crops into the bin 50. The details of the conveyor system for moving the crops from the sides of the helical guide member 15 into the bin 50 are not important, since a number of conventional techniques for doing this already exist in other types of farm machinery. These techniques readily can be adapted for use with the harvesting machine described above.

By mounting the shaft 16 parallel with the ground, each of the plants 18 is subjected to the picking action of all of the picking elements 30 and 32 of both groups of picking elements as the machine passes over the plants. Because the plants are subjected to both a pushing and pulling back-and-forth action by virtue of the upward movements of the arcuate picking elements 30 and 32, substantially the entire crop carried by each of the plants 18 is exposed at one or more times to the picking action from one of the picking elements 30. As shown most clearly in FIG. 3, the picking elements are caused to extend into the turn-to-turn spacing between adjacent turns of the helical guide member 15 a sufficient distance; so that they overlap one another, insuring a complete picking action of each plant 18 as they pass over the plant.

Figure 2:
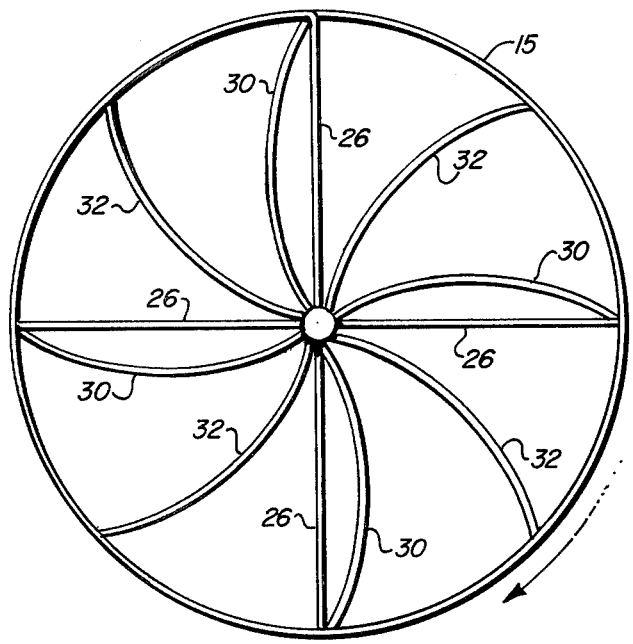
FIG. 2 is an enlarged end view of a portion of the embodiment shown in FIG. 1.

In order to avoid unnecessary cluttering and confusion in the drawings, only a representative few of the picking elements 30 have been illustrated in FIG. 1. None of the picking elements 32 of the "forward" group of picking elements are shown in FIG. 1. In FIG. 3, all of the picking elements 30 are shown; but only half of the picking elements 32 of the forward group of elements have been shown, since to illustrate the other half of the picking elements 32 in FIG. 3 has been found to introduce a great deal of confusion to the side view of this figure. It should be understood, however, that when the harvesting elements of the machine is viewed from the end as shown in FIG. 2, all of the picking elements 30 from front to back in the machine are aligned with one another as seen in FIG. 2. Similarly, all of the picking elements 32 of the second group of picking elements from front to back in the machine are aligned with one another so that the "fan-like" appearance shown in FIGS. 2 and 4 is presented when the machine is viewed directly from the front or the back. All of the picking elements are mounted to allow the plants to deflect over them away from the guide member 15 as they work through the plant.

The distance between the ground and the shaft 16 of the machine is chosen so that the tops of the tallest plants to be harvested by the machine pass underneath the shaft 16. The plants 18 can be shorter than this maximum distance; but if taller plants are encountered, a helical guide member 15 having a greater diameter must be employed. In addition it should be noted that the lead or input turn of the guide member 15 does not have any picking elements of either group attached to it. The first picking element is the element 30 located 180 degrees from the support member 26 used to support the open end of the input of the helical guide member 15.

By leaving the input turn of the helical guide member 15 open, as illustrated most clearly in FIG. 3, the plant 18 is located within the turns of the guide member 15 before it is subjected to the back and forth buffeting of the picking elements 30 and 32. This insures its proper location within the harvesting member for optimum harvesting results without damage to the plant. Also the turn-to-turn spacing of the helical guide member 15 is selected to be substantially equal to the plant-to-plant spacing of the plants and the like. Typically, this spacing varies between four inches and ten inches.

In a machine which is actually constructed to harvest green chile peppers, the shaft 16 is rotated at approximately 20 revolutions per minute while the ground speed of the machine over the row of plants is approximately one mile per hour. Of course, the speed of the machine (and accordingly the speed of rotation of the shaft 16) can be varied in order to adjust to different operating and harvesting conditions encountered. With the clockwise rotation of the helix 15, the center of the shaft 16 is offset to the right of the row of plants (as viewed in FIGS. 2 and 4) approximately four or five inches to insure the upward picking action described above.

A shroud 60 is generally provided over the portion of the machine occupied by the helical guide member 15 to catch any peppers or other crops harvested by the machine which might otherwise be tossed out of the machine. This shroud directs such picked crops downwardly onto the conveyor belts 40 and 41. This prevents unnecessary loss of crops.

Although the helical guide member 15 is illustrated in the different figures of the drawings as an open helix (that is one made of a rod supported by the support bars 26), this guide member also could be a solid helix, such as the type employed in augers or screws. Either of these constructions is possible for the guide member 15 since, for the most part, the guide member 15 does not ever actually come into contact with the plants 18.

The picking elements 30 and 32 ideally should be formed of open loops in the form of arcuate rods or the like, as illustrated; so that the harvested peppers or other crops can drop past them onto the conveyor belts 40 and 41. The diameter of the rods used for the picking elements 30 and 32 may vary but should be small enough to permit the stems of the peppers to be engaged to snap off the peppers. At the same time, the diameter of these rods should be large enough to avoid catching any of the leaves of the plants 18; so that the leaves are not torn off the plants. Typically a rod of 3/16 inch diameter or so has been found suitable for harvesting pepper plants such as green chile peppers, red chiles, etc.

While the foregoing description of the invention has been made in conjunction with the preferred embodiment shown in FIGS. 1 to 5, it will be apparent to those skilled in the art that variations which differ from the embodiment shown may be used without departing from the true inventive concept. As a consequence, the illustrated embodiment is to be considered for the purposes of illustration only and is not to be considered as limiting of the invention to the specific structure shown.

I claim:

1. A mechanized harvesting machine including in combination:
   a central rotatable shaft means mounted in said harvesting machine;
   helical guide means having a predetermined radius attached to and centered on said shaft means; and
   a plurality of arcuate picking elements connected between said helical guide means and said shaft means, said picking elements each extending a predetermined distance into the space between adjacent turns of said helical guide means.

2. The combination according to claim 1 including a shroud on said machine over said helical guide means for preventing crops removed from plants by said picking elements from being thrown out of the machine.

3. The combination according to claim 1 wherein said helical guide means has a uniform turn-to-turn spacing between adjacent turns thereof.

4. The combination according to claim 3 wherein said rotatable shaft means is mounted in the harvesting machine parallel to the ground over which the machine is operated and is placed longitudinally of the direction of movement of the machine.

5. The combination according to claim 4 wherein the radius of said helical guide means is selected to be at least equal to the maximum height of plants to be harvested by the machine, and said rotatable shaft means is mounted at a height selected to cause the bottom of the turns of said helical guide means to be located near the ground.

6. The combination according to claim 5 wherein the turn-to-turn spacing adjacent turns of said helical guide means is selected to be approximately equal to the spacing between plants to be harvested, and the machine moves over the plants at a predetermined speed, with said helical guide means being rotated at a predetermined speed of rotation synchronized with the longitudinal speed of movement of said machine; so that said helical guide means threads its way through the row of plants with said picking elements contacting said plants to harvest crops carried thereby.

7. The combination according to claim 6, including means for synchronizing the speed of rotation of said rotatable shaft means with the longitudinal movement of said rotatable shaft means as the harvesting machine is moved over a row of plants.

8. The combination according to claim 5 further including crop collecting means in the harvesting machine to collect the crop picked from the plants by said picking elements.

9. The combination according to claim 8 wherein said collecting means comprises conveyor means mounted in said machine on opposite sides of said helical guide means below said shaft means for collecting the crop harvested by the machine and conveying the crop away from said helical guide means.

10. The combination according to claim 1 wherein said arcuate picking elements each comprise a rod member with a predetermined overall length which is greater than the radius of helical guide means.

11. The combination according to claim 10 wherein said arcuate picking elements are equi-angularly spaced about said shaft means.

12. The combination according to claim 11 wherein said arcuate picking elements comprise first and second groups of picking elements, the elements of said first group extending into the spaces between adjacent turns of said helical guide means in one direction relative to the length of said shaft means, and the elements of said second group of picking elements extend into the spaces between adjacent turns of said helical guide means in the opposite direction relative to the length of said shaft means, the picking elements of both of said groups extending into such spaces at an angle relative to the direction of rotation of said guide means which permits the plant being picked to slide over said picking elements.

13. The combination according to claim 12 wherein alternate ones of said picking elements are part of said first and second groups of picking elements, respectively.

14. The combination according to claim 13 wherein each of said picking elements of said first group are spaced apart at 90 degree intervals and are uniformly spaced longitudinally along said shaft means, and each of said picking elements of said second group are spaced apart from one another at 90 degree intervals and are uniformly spaced longitudinally along said shaft means, with the elements of each of said first group being offset from the elements of said second group by 45 degrees.

15. The combination according to claim 13 wherein said arcuate picking elements extend into the spaces between the adjacent turns of said helical guide means a distance sufficient to overlap such spaces.

16. The combination according to claim 15 wherein said picking elements of said first and second groups each extend substantially half way into the turn-to-turn spaces between adjacent turns of said helical guide means, so that plants to be harvested by the machine are pushed and pulled in a serpentine path as the machine moves said shaft means longitudinally over the row of plants, and said helical guide means is rotated to thread its way through such row of plants.

* * * * *